Sept. 26, 1939.  L. F. WHITNEY  2,174,300
REFRIGERATION
Filed May 11, 1938  2 Sheets-Sheet 1
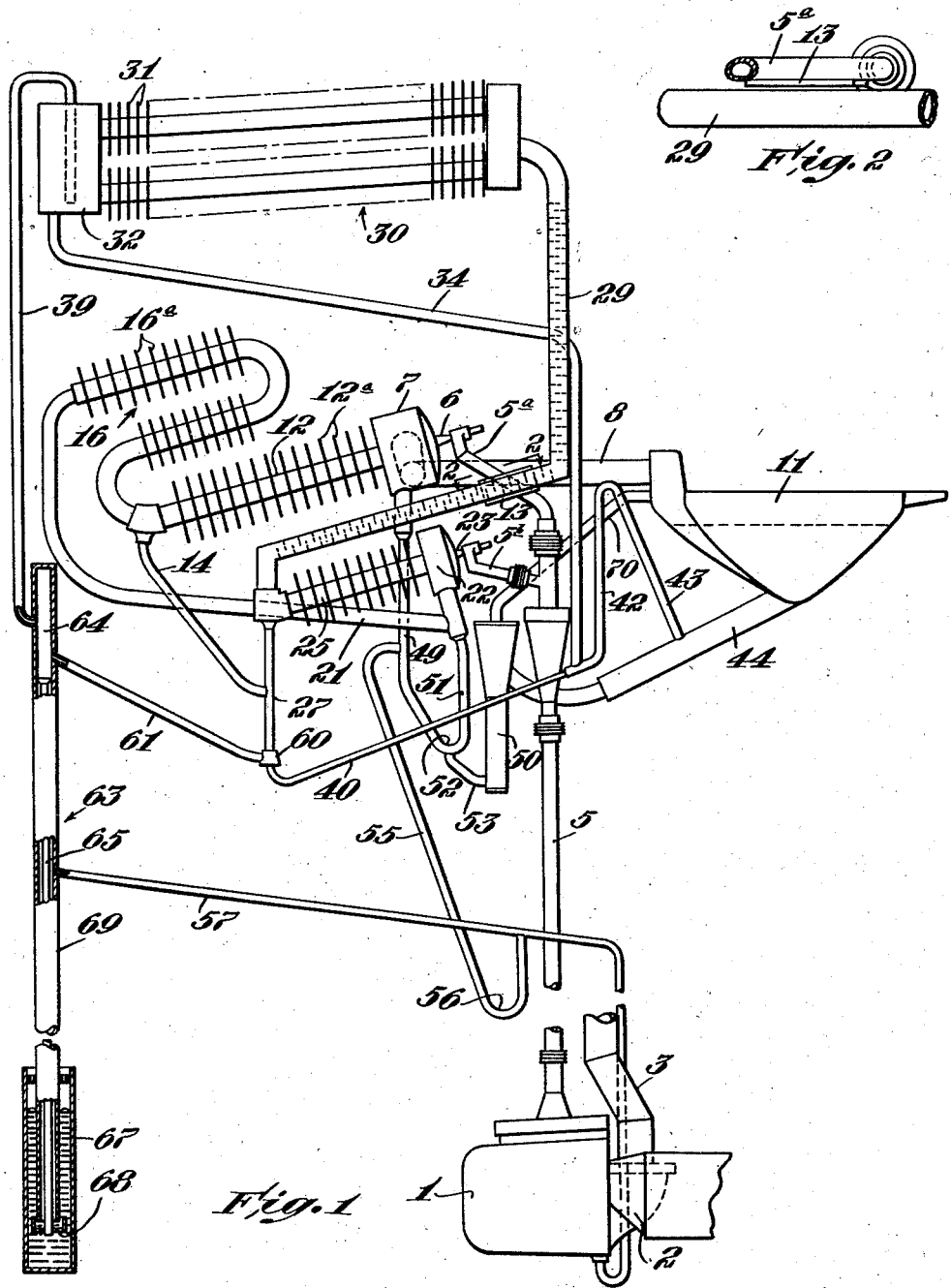
Inventor
Lyman F. Whitney
by Roberts, Cushman & Woodbury
Att'ys.

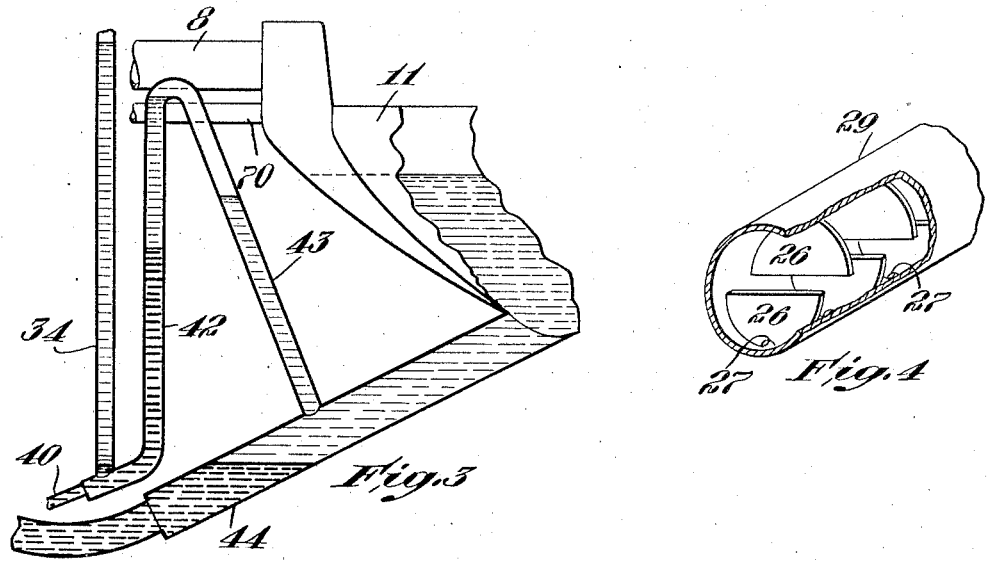
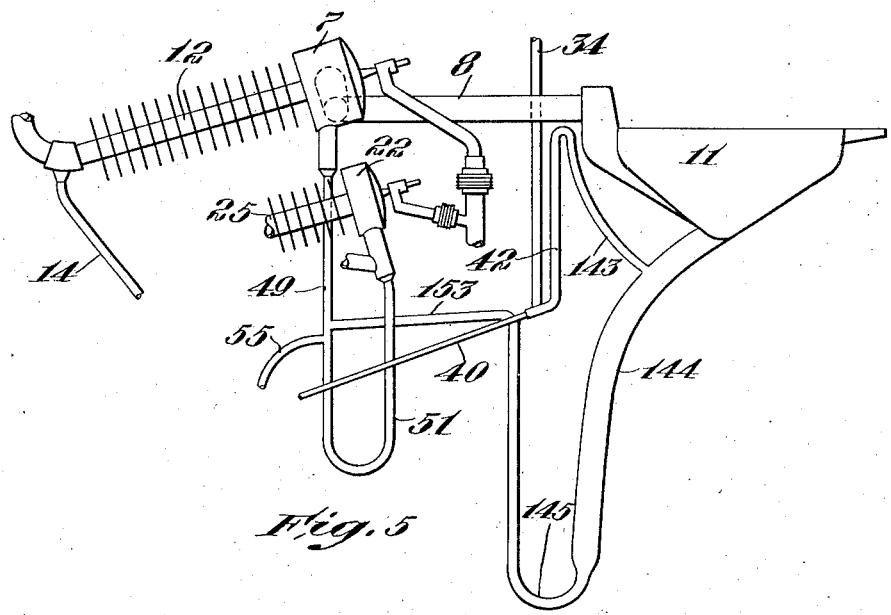

Patented Sept. 26, 1939

2,174,300

UNITED STATES PATENT OFFICE 2,174,300

REFRIGERATION

Lyman F. Whitney, Cambridge, Mass., assignor, by mesne assignments, to Stator Corporation, a corporation of Rhode Island Application May 11, 1938, Serial No. 207,268

28 Claims. (Cl. 62—115)

This invention relats to an improved refrigerating apparatus of the general type disclosed in United States Patent No. 1,761,551 to Eastman A. Weaver and in my United States Patent No. 1,756,802. The present application is a continuation-in-part of my copending application Serial No. 171,325, filed October 27, 1937.

The above-identified patents disclose a system employing water as a refrigerant and mercury as a propellant. While water has very advantageous characteristics for this purpose, it often is desirable to provide a refrigerant which has a lower freezing point. Furthermore, while water and mercury are liquids which are substantially immiscible under all ordinary conditions, I have found that under certain operating conditions very fine particles of mercury, such as are provided by mercury vapor or by mercury fog, when contacting water, tend to assume an extremely finely dispersed condition in the water to form therewith a more or less stable sludge. For example, when some mercury passes with the water vapor to the refrigerant condenser, a sludge may be formed. This sludge drains to the cooler, where it may gradually become heavier as more sludge is received from the condenser. Furthermore, mercury vapor or fog may occasionally pass directly from the aspirator mixing chamber into direct contact with the water in the cooler, thus causing the formation of a sludge. The tendency to form sludge is aggravated in a system having walls of ordinary steel. The proportions of mercury and water in the sludge may vary widely, and the heavier sludge may resemble mud.

I call suspension of mercury in water a sludge suspension. Depending upon operating conditions, this suspension may be either lean or rich in the mercury. If only a thin sludge suspension exists in the system, the effects are negligible. However, the mercury tends to settle in such a body of sludge suspension; the settling mercury may not coalesce, but rather may form a mud-like sludge deposit. Should the factors that cause the original suspension continue to be present, they cause the formation of further sludge suspension from which additional mercury settles, thus augmenting the mud-like deposit. When the sludge suspension is relatively rich in mercury, the tendency to form the mud-like deposit is increased. Any type of sludge except a thin sludge suspension is deleterious because it involves a collection of mercury where it is not needed, this materially increasing the total amount of the relatively expensive mercury required in the system. A sludge deposit is also deleterious since it tends to impede free circulation of the fluids through pipes.

When it is desirable to operate the cooler at a temperature below 32° F., I prefer to employ an aqueous refrigerant comprising a solution of a suitable anti-freeze agent in water. Among anti-freeze agents are "methyl Cellosolve" (the mono methyl ether of ethylene glycol), ethylene diamine, and morpholine. In a system having conventional steel walls, I prefer to use an anti-freeze agent which in the major part consists of methyl Cellosolve and which preferably includes a minor part of ethylene diamine. I have found that the employment of methyl cellosolve may aggravate the tendency toward the formation of a deleterious sludge. On the other hand, when either ethylene diamine or morphine is employed, either with water alone or with water and methyl Cellosolve, the sludge suspension is thinner and the sludge deposit more capable of flowing.

The present invention affords improved refrigerating systems of this general character in which the formation of sludge may be impeded, and in which sludge which does form may readily be broken up or resolved. The formation of sludge is impeded by the application of heat to the refrigerant circuit, i. e., to the duct extending between the aspirator assembly and the refrigerant condenser. The sludge which does form collects in the cooler, which preferably has inclined lower walls arranged to direct the sludge to a drain, with which a suitable sludge separator is associated.

The separation of sludge into mercury and refrigerant may be effected by evaporation of the refrigerant from the sludge, this evaporation being effected by heat and/or suction. The separation of the sludge may be also effected by the application of pressure. To this end, for example, a suitable duct may be arranged to receive the sludge from the cooler so that the sludge collects in a relatively high column. Under these conditions, the sludge at the lower part of the column is subjected to a substantial liquid head, and the refrigerant is "squeezed out" of this lower part of the column. Accordingly, the sludge in the lower part of the column coalesces into mercury, and the refrigerant rises to the upper part of the column. If desired, the sludge separator may involve both the separation of the sludge by evaporation of the refrigerant and by the subjection of the sludge to a substantial liquid head.

The sludge separator may conveniently be associated with a preferred return pipe assembly through which refrigerant is returned to the cooler. This assembly may be arranged to permit the system to be relatively compact and to permit the balancing of pressure differences by liquid columns without necessitating the location of the refrigerant condenser at a height greatly above the cooler. To permit this desirable result, the refrigerant return duct may be provided with a trap in which a column of propellant substantially balances the difference between the cooler and condenser pressures, this trap being arranged so that the height of the propellant column is automatically varied in response to variations in the pressure differential between the cooler and the condenser.

In the drawings:

Fig. 1 is a diagrammatic view of a refrigerating system of the type provided by the present invention;

Fig. 2 is a section on line 2—2 of Fig. 1;

Fig. 3 is an enlarged view of the trap assembly associated with the cooler, a typical arrangement of the liquids in this part of the system being shown in this figure;

Fig. 4 is a broken isometric view of a portion of the duct between the aspirator assembly and the refrigerant condenser; and Fig. 5 is a diagrammatic view of a portion of a system similar to that shown in Fig. 1 but being provided with an optional sludge separating arrangement.

A system of this type may comprise a boiler 1 having a suitable heater, such as a gas burner assembly 2, and being provided with a draft-inducing flue 3, only a portion of which is shown in Fig. 1. Mercury vapor passes from the boiler 1 through the riser pipe 5 to the branches 5ª and 5ᵇ which are connected respectively to the first and second stage aspirators. The first stage aspirator may comprise a nozzle 6 from which mercury vapor passes at high velocity into a mixing chamber 7. The latter is connected by a vapor duct 8 to the cooler or evaporator 11. The cooler may contain a body of liquid refrigerant, such as water, and a suitable anti-freeze ingredient. Vapor is drawn through the pipe 8 to the mixing chamber 7, and the mixed propellant and refrigerant vapors pass into the funnel 12 where the refrigerant is compressed and mercury is condensed. This funnel preferably is provided with cooling means, such as fins 12ª.

Condensed mercury flows from the lower end of the funnel 12 into a drain 14, while the remaining vapor passes into a pipe coil or loop 16, which may be provided with cooling fins 16ª and which forms an interstage cooler. The latter is connected through a duct 21 with the second stage mixing chamber 22 into which a stream of mercury vapor flows from the second stage nozzle 23. This propellant stream causes further compression of the refrigerant vapor in the second stage funnel 25. A drain 27 receives condensed mercury from the funnel 25 and from the drain 14. Compressed refrigerant passes upwardly from the funnel 25 through the duct 29 to the refrigerant condenser 30. Preferably the duct 29 is arranged in heat-transfer relation to a warm part of the system, such as the funnel 25, and the riser branch 5ª.

In order to aid the heating of duct 29, the riser branch 5ª may carry a metal strip 13 welded thereto and arranged in close juxtaposition to the pipe (Fig. 2). Also the pipe 29 preferably is provided with internal fins 26 (Fig. 3). These fins are preferably arranged in spaced, staggered relation within the pipe and enhance the effect of preventing the formation of sludge. Preferably, as shown in Fig. 3, the fins at the lower part of the pipe may be provided with openings 27 through which liquid may drain, thus preventing pocketing of liquid in this part of the system.

I have found that the provision of the warm pipe 29 between the aspirator assembly and the refrigerant condenser not only impedes the formation of sludge, but may also substantially prevent mercury from passing to the condenser. Possibly the formation of sludge may be partly due to electrically charged mercury particles coming into contact with water. The particles upon striking the warm surfaces of the pipe, may lose their charges so that they thereafter coalesce into liquid mercury in the presence of water.

The condenser 30 may be of any suitable form, being either air cooled or water cooled, as desired. My copending application Serial No. 171,647, filed October 29, 1937, discloses a preferred type of condenser. As shown herein, for example, the condenser 30 comprises a conventional pipe assembly with cooling fins 31. A chamber or drum 32 preferably is located at the end of the condenser 30 which is remote from pipe 29. A pipe 39 has an open end communicating with this chamber and receives non-condensable gases therefrom. The lower portion of this chamber is connected to a drain or refrigerant return pipe 34 through which condensed refrigerant passes on its way back to the cooler 11.

The lower end of the pipe 34 is connected to an inclined tube 40, the upper end of which has a vertical continuation 42 that may extend above the level of the liquid in the cooler 11. Pipe section 42 has a connection with a downwardly extending pipe 43 which is connected to a duct 44 that also serves as a drain. The lower part of the cooler 11 is provided with walls which incline downwardly to the drain 44, and the latter in the region of its connection to the cooler also preferably has a substantial inclination.

The drainpipe 27 for the second stage funnel 25 has a lower end communicating with a small chamber 60 to which the lower end of the inclined pipe 40 is also connected, while an upwardly inclined duct 61 extends from this chamber 60 to the chamber 64 of the purger assembly 63. This chamber 64 receives gas through the pipe 39 and a drop tube 65 of restricted internal diameter extends downwardly therefrom. Globules of liquid propellant spilling over from the duct 61 entrain bodies of non-condensable gas in the tube 65, compressing the gas as they move downwardly through the tube. The lower end of tube 65 is immersed in a body of liquid propellant in the well 67, the upper surface of this liquid propellant being exposed to the atmosphere.

A return duct 69 is disposed about the tube 65 and is connected to a pipe 57, there being a very small pressure equalizing vent between the upper part of duct 69 and the chamber 64. A deflector 68 prevents gas from rising into the duct 69 from the lower end of drop tube 65.

The arrangement of the spill-over connection between tube 61 and chamber 64 determines the level of the propellant in the trap provided by the lower parts of ducts 34 and 42. The condensed propellant received from drains 14 and 27 passes into the chamber 60 and from the latter may pass to the spill-over connection, thus being received by the purger. From the purger the liquid propellant flows through pipe 57 back to the boiler, the height of the mercury in pipes 57 and 69 being sufficient to balance the boiler pressure.

During normal operation of the system, the trap provided by pipes 61 and 40 is constantly receiving condensed mercury from the drain 27, and the spill-over connection between pipe 61 and chamber 64, definitely limits the height of the mercury in pipe 27. Thus a mercury column of constant height is automatically maintained in the leg 61 of the trap, while the total static pressure in this leg of the trap is provided by this mercury column plus the condenser pressure thereabove. This static pressure is balanced in the opposite leg of the trap by the mercury in the tube 40 below its connection to the duct 34, and by the liquid columns in the respective branches 34 and 42 of this leg, as well as the pressures above these respective columns. The liquid heads in the branches 34 and 42 may be provided by bodies of mercury and liquid refrigerant.

Fig. 3 discloses a typical position of the liquid in the ducts 34 and 42, the lower part of the duct 34 containing a column of liquid refrigerant, and the duct 42 containing a column of propellant above the connection of duct 34 with duct 40. This column of liquid propellant substantially balances the difference between the condenser and cooler pressures. Above the mercury column in pipe 42, there may be a column of liquid refrigerant, from the top of which refrigerant may spill over into the duct 43. As additional refrigerant is received at the lower part of duct 34, the liquid head within this duct becomes sufficient to depress the mercury so that some of the refrigerant may rise through the mercury in the upper part of inclined duct 40 and in duct 42. When the difference between the condenser and cooler pressures increases, additional mercury received from drain 27 passes upwardly through duct 40 and into duct 42, so that the height of the liquid column balancing the difference between the cooler and condenser pressures is automatically increased in response to an increase in this pressure difference. On the other hand, when this pressure difference decreases, mercury from the duct 42 and upper part of duct 40 moves downwardly, causing mercury to overflow at the spill-over connection between the duct 61 and chamber 64. This arrangement permits the trap assembly associated with the cooler to be compact so that the condenser 30 may be located only a moderate distance above the cooler.

The lower part of duct 44 provides a shallow trap communicating with a drum or chamber 50. The duct 44 preferably has a relatively large diameter to permit the movement of heavy sludge therethrough. The drum 50 may extend downwardly a substantial distance below its connection to the trap provided by duct 44. The upper part of the drum 50 preferably is connected by a vapor duct 70 to the low pressure portion of the system, such as the head of the cooler 11. Thus the upper part of this drum, during normal operation of the system, is subject to the lower pressure of the first stage aspirator head. The drum may also be conveniently disposed adjoining relatively warm parts of the system, such as the upper part of the propellant riser 5 and the head of the second stage aspirator assembly.

The first stage mixing chamber 7 is provided with a drain 49 to receive any propellant particles condensing therein, while the second stage mixing chamber is provided with a corresponding drain 51, these drains being connected at their lower ends to provide a trap 52. An upwardly inclined duct 53 may extend from the lower part of the drum 50 to the lower part of the trap 52. The leg of the trap 52 formed by drain 49 is provided with a spill-over connection with a duct 55, the lower part of which provides a trap 56 connected to the duct 57. Accordingly, mercury from the drains 49 and 51 may spill over into the pipe 55 and return from the latter through the duct 57 to the boiler 1.

When sludge collects in the cooler 11, it may form a mud-like deposit on the lower walls of the cooler. Since the cooler is provided with lower walls which slope downwardly toward the pipe 44, this heavy mud-like deposit can drain into the pipe and thence pass into the drum 50. Since the latter is connected to the low pressure portion of the system and is in a relatively warm location, the more volatile part of the heavy sludge, i. e., the refrigerant, is evaporated and drawn into the first stage mixing chamber, while the mercury residue flows downwardly and is received by the pipe 53.

Since the drum 50 extends a substantial distance below the spill-over connection between pipes 49 and 55, any sludge in the lower part of this drum is subjected to a substantial liquid head. This results in a tendency to squeeze refrigerant out of this sludge, so that the mercury may coalesce.

The drum 50 may not only function as a sludge separator but it also is effective in automatically reducing the rate of evaporation in the cooler when the refrigerant freezes in the upper part of pipe 44. Under these conditions, the refrigerant can no longer pass to the cooler but piles up in the tube 34 until it has sufficient head to cause it to displace some of the mercury in the shallow trap provided by duct 44, and to pass to the drum 50. Since the upper part of this drum is connected by pipe 70 to the low pressure portion of the refrigerant circuit, refrigerant vapor is then withdrawn from the drum 50 as well as from the cooler 11 by the first stage aspirator. Accordingly, part of the pumping effect of the first stage jet is then being employed in pumping vapor from drum 50, and the rate of evaporation in cooler 11 is correspondingly reduced so that its temperature rises, thus causing the ice which has formed in the pipe 44 to melt.

It is evident that the drum 50 always contains a body of mercury and that ordinarily this mercury may stand at a level near that of the spillover connection between ducts 49 and 55. Accordingly, foreign particles finding their way into this part of the system float on the surface of the mercury body and do not pass out of the drum.

If preferred, and especially when an anti-freeze agent is employed which does not aggravate sludge formation, a sludge separator of the type shown in Fig. 5 may be employed. This figure discloses portions of the aspirator assemblies and a cooler of the general type shown in Fig. 1, these and other corresponding parts being identified by reference numerals similar to those in Fig. 1. In accordance with this embodiment of the invention, however, the lower part of the cooler 11 is connected to a large diametered drain 144, which receives refrigerant from a duct 143 corresponding to the duct 43 of Fig. 1. The duct 144, however, extends downwardly a substantial distance below its connection to the tube 143 to permit the collection of sludge in a relatively high column, so that sludge at the lower part of duct 144 is subjected to a substantial liquid head. Accordingly, the sludge as it moves downwardly and is subjected to this head, is so squeezed that refrigerant is separated from propellant.

The coalesced mercury passes downwardly from the bottom of the duct 144 into a trap 145. This trap may be provided by a tube of smaller diameter than the duct 144, since the coalesced mercury will readily pass through a tube of smaller diameter than will the mud-like sludge.

The trap 145 is provided with a spill-over connection 153 with the first stage drain 49, from which mercury overflows through the duct 55 and thus passes back to the boiler.

It is evident that the present invention provides means impeding the formation of sludge in a refrigerating system of the type described, and that the invention also provides means for separating sludge that does form in such a system. For the first-named purpose not only may a sludge inhibitor, such as ethylene diamine or morpholine be employed in the refrigerant, but the duct extending from the aspirator assembly to the condenser may be heated in the manner disclosed.

In order to separate sludge which has formed in a system of this character, the cooler is preferably arranged so that this sludge may drain to a suitable separator. Such a separator may be arranged so that refrigerant is evaporated from the sludge due to heat and/or suction and/or so that the sludge is subjected to a substantial pressure or liquid head which results in squeezing the refrigerant out of the sludge.

In some respects the present invention involves features disclosed in my copending application Serial No. 171,324, filed October 27, 1937, and in general the present application discloses an improved system of the general type disclosed in my copending application Serial No. 171,325, filed October 27, 1937.

It should be understood that the present disclosure is for the purpose of illustration only and that this invention includes all modifications and equivalents which fall within the scope of the appended claims.

I claim:

1. Refrigerating apparatus of the class described comprising a refrigerant circuit including a cooler and a condenser, a propellant circuit including a vaporizer and a part in common with the refrigerant circuit where propellant vapor is effective in entraining refrigerant vapor from the cooler and pumping the same to the condenser, said cooler having lower wall parts sloping downwardly, and a sludge separator connected to the bottom of the cooler for receiving sludge therefrom and for separating the sludge into propellant and refrigerant.

2. Refrigerating apparatus of the class described comprising a refrigerant circuit including a cooler and a condenser, a propellant circuit including a vaporizer and a part in common with the refrigerant circuit where propellant vapor is effective in entraining refrigerant vapor from the cooler and pumping the same to the condenser, said cooler having lower wall parts sloping downwardly, and a sludge separator connected to the bottom of the cooler for receiving sludge therefrom and for separating the sludge into propellant and refrigerant, said separator being in the form of a downwardly extending duct wherein the sludge may collect to afford sufficient liquid head to cause the separation of the sludge under pressure.

3. Refrigerating apparatus of the class described comprising a refrigerant circuit including a cooler and a condenser, a propellant circuit including a vaporizer and a part in common with the refrigerant circuit where propellant vapor is effective in entraining refrigerant vapor from the cooler and pumping the same to the condenser, said cooler having lower wall portions sloping downwardly, and a sludge separator connected to the bottom of the cooler for receiving sludge therefrom and for separating the sludge into propellant and refrigerant, said separator including a chamber having a smaller cross sectional area near its lower end than at its upper end.

4. Refrigerating apparatus of the class described comprising a refrigerant circuit including a cooler and a condenser, a propellant circuit including a vaporizer and a part in common with the refrigerant circuit where propellant vapor is effective in entraining refrigerant vapor from the cooler and pumping the same to the condenser, said cooler having lower wall parts sloping downwardly, and a sludge separator connected to the bottom of the cooler for receiving sludge therefrom and for separating the sludge into propellant and refrigerant, said separator being in the form of a downwardly extending duct wherein the sludge may collect to afford sufficient liquid head to cause the separation of the sludge under pressure, a second duct extending upwardly from said first-named duct to cooperate therewith in forming a trap, a pipe for returning propellant to the vaporizer, said second duct having a connection with said pipe.

5. Refrigerating apparatus of the class described comprising a refrigerant circuit including a cooler and a condenser, a propellant circuit including a vaporizer and a part in common with the refrigerant circuit where propellant vapor is effective in entraining refrigerant vapor from the cooler and pumping the same to the condenser, and means associated with the refrigerant circuit for preventing the formation of sludge in the condenser.

6. Refrigerating apparatus of the class described comprising a refrigerant circuit including a cooler and a condenser, a propellant circuit including a vaporizer and a part in common with the refrigerant circuit where propellant vapor is effective in entraining refrigerant vapor from the cooler and pumping the same to the condenser, said vaporizer containing a body of liquid propellant in the form of mercury, said refrigerant circuit including a duct between said common part and the refrigerant condenser, said duct being juxtaposed to a warm portion of the system whereby the formation of sludge in the condenser is impeded.

7. Refrigerating apparatus of the class described comprising a refrigerant circuit including a cooler and a condenser, a propellant circuit including a vaporizer and a part in common with the refrigerant circuit where propellant vapor is effective in entraining refrigerant vapor from the cooler and pumping the same to the condenser, said vaporizer containing a body of liquid propellant, means associated with the refrigerant circuit to prevent the formation of sludge in the condenser, and means to receive sludge which forms in the cooler and to break up sludge thus received.

8. Refrigerating apparatus comprising a refrigerant circuit including a cooler and a refrigerant condenser, a propellant circuit including a vaporizer and a part in common with said refrigerant circuit wherein refrigerant vapor from the cooler is entrained in a stream of the propellant vapor, said vaporizer containing a body of liquid mercury, said cooler containing a body of liquid refrigerant which tends to interact with the mercury to form a sludge, said apparatus including means to cause the separation of the refrigerant and mercury so that such a sludge does not collect to choke either of said circuits.

9. Refrigerating apparatus comprising a refrigerant circuit including a cooler and a refrigerant condenser, a propellant circuit including a vaporizer and a part in common with said refrigerant circuit wherein refrigerant vapor from the cooler is entrained in a stream of the propellant vapor, said vaporizer containing a body of liquid mercury, said cooler containing a body of liquid refrigerant which tends to interact with the mercury to form a sludge, and means to receive sludge from the cooler and to break up said sludge.

10. Low temperature refrigerating apparatus comprising a refrigerant circuit having a low pressure portion including a cooler and having a high pressure portion including a condenser, a propellant circuit including a vaporizer and a part in common with said refrigerant circuit wherein refrigerant vapor from the cooler is entrained in a stream of propellant vapor from the vaporizer, said cooler containing a body of aqueous refrigerant composed of water and an anti-freeze agent to depress the freezing point of the refrigerant, the anti-freeze agent tending to cause the formation of a sludge by the refrigerant and the mercury, a drain connected to the cooler to receive sludge therefrom, a chamber connected to the drain, a duct connecting the chamber to the low pressure portion of the refrigerant circuit so that refrigerant vapor is drawn from the sludge in said chamber.

11. Refrigerating apparatus comprising a refrigerant circuit having a low pressure portion including a cooler and having a high pressure portion including a condenser, a propellant circuit including a vaporizer and a part in common with said refrigerant circuit wherein refrigerant vapor from the cooler is entrained in a stream of the propellant vapor from the vaporizer, said vaporizer containing a body of mercury, said cooler containing a body of refrigerant which may interact with mercury to form a sludge, a chamber connected to the cooler to receive sludge therefrom, said chamber communicating with the common part of said circuits so that refrigerant vapor may be drawn from the sludge in said chamber, and means for directing the mercury residue from the chamber to the vaporizer.

12. Method of refrigeration comprising vaporizing mercury to provide a mercury vapor stream, entraining refrigerant vapor from a cooler in the mercury vapor stream, condensing the major portion of the mercury out of the resulting stream of mixed vapors, separately condensing the remaining vapor of the stream and directing the resulting condensate back to the cooler, removing from the cooler sludge formed by mercury and the refrigerant, drawing refrigerant vapor from the sludge by entrainment in the mercury vapor stream, thus breaking up the sludge, and returning the residue of mercury to the region of mercury vaporization.

13. Low temperature refrigerating apparatus comprising a refrigerant circuit including a cooler and a condenser, a propellant circuit including a vaporizer and a part in common with said refrigerant circuit wherein refrigerant vapor from the cooler is entrained in a stream of propellant vapor from the vaporizer, said cooler containing a body of aqueous refrigerant, a drain connected to the cooler to receive sludge therefrom, a chamber connected to the drain, said chamber communicating with the common part of the circuits so that refrigerant vapor is drawn from the sludge in said chamber and entrained in the propellant vapor stream, the refrigerant circuit including a return duct extending from the condenser to a connection with said drain, so that the returning refrigerant may normally rise from said connection through the upper part of the drain to the cooler, the returning refrigerant passing through the lower part of the drain to the chamber and being vaporized when said upper part of the drain becomes choked with frozen refrigerant, the refrigerant thus received by the chamber being vaporized and drawn into said common part so that the rate of vaporization in the cooler is thereby automatically reduced.

14. Low temperature refrigerating apparatus comprising a refrigerant circuit having a low pressure portion including a cooler and having a high pressure portion including a condenser, a propellant circuit including a vaporizer and a part in common with said refrigerant circuit wherein refrigerant vapor from the cooler is entrained in a stream of propellant vapor from the vaporizer, said cooler containing a body of aqueous refrigerant, a drain of relatively large diameter connected to the bottom of the cooler, the cooler having lower walls sloping downwardly toward the connection with the drain so that relatively thick sludge may gravitate into the drain, a chamber connected to the drain and to the low pressure portion of the refrigerant circuit, said chamber being arranged to receive sludge from the drain whereupon vapor is drawn from the sludge into said low pressure portion.

15. Refrigerating apparatus of the class described comprising a propellant circuit and a refrigerant circuit, said circuits having a part in common where propellant vapor pumps and compresses refrigerant vapor and wherein the propellant vapor is condensed, said propellant circuit also including a boiler, a pipe to direct propellant vapor from the boiler to said common part, and a return pipe to direct condensed propellant from said common part back to the boiler, said refrigerant circuit also including a refrigerant condenser and a cooler, said propellant vapor normally pumping refrigerant vapor through said common part from a body of liquid refrigerant in the cooler, said system including piping arranged normally to supply liquid refrigerant from the refrigerant condenser to the cooler, said piping being arranged so that when freezing of the refrigerant occurs therein adjoining the cooler, the condenser refrigerant may be supplied to a region from which it may be pumped by the propellant vapor in said common part, so that the proportion of vapor being pumped from the cooler is automatically reduced and the temperature of the cooler is automatically increased to melt the frozen refrigerant.

16. Refrigerating apparatus comprising a refrigerant circuit having a low pressure portion including a cooler and having a high pressure portion including a condenser, a propellant circuit including a vaporizer and a part in common with said refrigerant circuit wherein refrigerant vapor from the cooler is entrained in a stream of the propellant vapor from the vaporizer, said vaporizer containing a body of mercury, a return duct extending from the condenser to the cooler, a chamber, a trap between the duct and the chamber, said trap normally preventing flow of refrigerant from the duct to the chamber but permitting such flow when refrigerant freezes to prevent flow through the duct to the cooler, and a pipe connecting the chamber to the low pressure portion of the refrigerant circuit so that refrigerant vapor may be drawn from the chamber thereby causing an automatic reduction of the rate of evaporation in the cooler.

17. Method of refrigeration comprising continuously entraining refrigerant vapor from a cooler in a propellant vapor stream, condensing propellant out of the resulting mixed vapors, separately condensing the refrigerant, and returning the condensed refrigerant to the cooler until the temperature of the cooler falls below a predetermined point, thereupon diverting the condensed refrigerant from the cooler, and drawing refrigerant vapor from the diverted refrigerant by entrainment in the propellant vapor stream, thus employing part of the energy of the propellant vapor stream to pump refrigerant vapor from a region outside of the cooler when the cooler has reached an undesirably low temperature.

18. Refrigerating apparatus comprising a refrigerant circuit having a low pressure portion including a cooler and having a high pressure portion including a condenser, a propellant circuit including a vaporizer and a part in common with said refrigerant circuit wherein refrigerant vapor from the cooler is entrained in a stream of the propellant vapor from the vaporizer, said vaporizer containing a body of mercury, a return duct extending from the condenser to the cooler, said duct having a trap with a pressure balancing column of propellant in one leg, a section of the duct extending downwardly from said leg to a connection to the cooler below the latter, means connected to said trap automatically to vary the height of the pressure balancing column in response to changes in the pressure difference between the cooler and condenser, a chamber arranged to receive sludge from said connection, and a pipe connecting the chamber to the low pressure portion of said refrigerant circuit, whereby the refrigerant may be drawn from the sludge.

19. Method of refrigeration comprising vaporizing mercury to provide a mercury vapor stream, entraining refrigerant vapor from a region of refrigeration in the mercury vapor stream, condensing the major portion of the mercury out of the resulting stream of mixed vapors, separately condensing the remaining vapor and removing from the resulting condensate sludge formed by mercury and the refrigerant, vaporizing refrigerant from the removed sludge at a point separated from said region, thus breaking up the sludge and returning the mercury residue from said point to the region of vaporization.

20. Refrigerating apparatus of the class described comprising a refrigerant circuit including a cooler and a condenser, a propellant circuit including a vaporizer and a part in common with the refrigerant circuit where propellant vapor is effective in entraining refrigerant vapor from the cooler and pumping the same to the condenser, the propellant circuit also including a vapor pipe between the vaporizer and said common part, said refrigerant circuit including a duct between said common part and the refrigerant condenser, said duct having a portion in heat transfer relation to said vapor pipe, whereby said duct is heated and the formation of sludge in the condenser is impeded.

21. Refrigerating apparatus of the class described comprising a refrigerant circuit including a cooler and a condenser, a propellant circuit including a vaporizer and a part in common with the refrigerant circuit where propellant vapor is effective in entraining refrigerant vapor from the cooler and pumping the same to the condenser, said vaporizer containing a body of liquid propellant in the form of mercury, said propellant circuit including a riser pipe through which mercury vapor passes from the vaporizer to said common part, the refrigerant circuit including a duct extending from the common part to the refrigerant condenser, a portion of said duct and said riser pipe being in heat transfer relation whereby the duct is heated and formation of sludge in the condenser is impeded.

22. Refrigerating apparatus of the class described comprising a refrigerant circuit including a cooler and a condenser, a propellant circuit including a vaporizer and a part in common with the refrigerant circuit where propellant vapor is effective in entraining refrigerant vapor from the cooler and pumping the same to the condenser, said vaporizer containing a body of liquid propellant in the form of mercury, said cooler containing a body of refrigerant comprising a solution of the mono methyl ether of ethylene glycol, which may interact with mercury particles to form a sludge, the refrigerant circuit including a duct extending from the common part to the condenser, said duct being in heat transfer relation to a warm portion of the system to impede the formation of sludge by such interaction of the refrigerant vapor and mercury.

23. Refrigerating apparatus of the class described comprising a refrigerant circuit including a cooler and a condenser, a propellant circuit including a vaporizer and a part in common with the refrigerant circuit where propellant vapor is effective in entraining refrigerant vapor from the cooler and pumping the same to the condenser, said vaporizer containing a body of liquid propellant in the form of mercury, means associated with the refrigerant circuit to prevent the formation of sludge in the condenser, and means to receive sludge which forms in the cooler and to break up sludge thus received, said last-named means including a chamber and a duct through which the chamber communicates with said common part of the circuit so that refrigerant vapor is drawn from the sludge in said chamber.

24. Refrigerating apparatus of the class described comprising a refrigerant circuit including a cooler and a condenser, a propellant circuit including a vaporizer and a part in common with the refrigerant circuit where propellant vapor is effective in entraining refrigerant vapor from the cooler and pumping the same to the condenser, said vaporizer containing liquid propellant, a chamber arranged to receive sludge from the cooler, said chamber containing a body of liquid propellant and having an overflow connection through which propellant may pass to be returned to the vaporizer, said connection being arranged so that the liquid body is maintained at a predetermined level in the chamber whereby foreign particles from the cooler may pass into the chamber and remain in the same while floating on the surface of the liquid body.

25. Refrigerating apparatus of the class described comprising a refrigerant circuit including a cooler and a condenser, a propellant circuit including a vaporizer and a part in common with the refrigerant circuit where propellant vapor is effective in entraining refrigerant vapor from the cooler and pumping the same to the condenser, said vaporizer containing liquid propellant in the form of mercury, a trap normally containing a body of mercury having one leg connected to the lower part of the cooler, a duct connecting the opposite leg of the trap with the common part of said circuits, means providing a spill-over connection from which mercury may return from the trap to the vaporizer, said spill-over connection determining the normal level of mercury in the trap and being arranged so that the body of mercury is permanently retained therein, the trap being arranged so that sludge from the cooler may pass through the trap and so that refrigerant vapor is drawn from the sludge, leaving the mercury residue in the trap.

26. Refrigerating apparatus of the class described comprising a refrigerant circuit including a cooler and a condenser, a propellant circuit including a vaporizer and a part in common with the refrigerant circuit where propellant vapor is effective in entraining refrigerant vapor from the cooler and pumping the same to the condenser, said vaporizer containing a body of liquid propellant in the form of mercury, a trap having a leg connected to the lower part of the cooler, the opposite leg of the trap being arranged to receive material draining from the cooler, a spill-over connection associated with said last-named leg so that a body of liquid mercury is permanently retained at a predetermined level in said leg, whereby foreign particles draining from the cooler may permanently float on the surface of the liquid body.

27. Method of refrigeration comprising entraining refrigerant vapor from a region of refrigeration in a stream of mercury vapor, condensing the major portion of the mercury out of the resulting stream of mixed vapors, then directing the remaining vapor past a surface while heating the surface and then condensing the remaining vapor and directing the resulting condensate back to the region of refrigeration, whereby refrigeration is produced and the formation of sludge in the condensate returning to the region of refrigeration is impeded.

28. Low temperature refrigerating apparatus comprising a refrigerant circuit including a cooler and a condenser, a propellant circuit including a vaporizer and a part in common with said refrigerant circuit wherein refrigerant vapor from the cooler is entrained in a stream of propellant vapor from the vaporizer, said cooler containing a body of aqueous refrigerant, a drain of relatively large diameter connected to the cooler, a return pipe in the refrigerant circuit extending from the condenser to a connection with said drain below the cooler, the lower part of the drain providing a propellant-containing trap, a chamber connected to the leg of the trap remote from said connection, said chamber communicating with the common part of said circuits, whereby sludge from the cooler may displace propellant in said trap and pass to the chamber and whereby refrigerant may displace propellant in the trap and pass to the chamber when the drain is choked with frozen refrigerant adjoining the cooler, and whereby refrigerant under either of these conditions may be drawn from said chamber to the common part, and a pipe through which propellant may flow from the chamber to the vaporizer, said pipe containing a column of the propellant to balance the vaporizer pressure, an overflow connection between said chamber and the last-named pipe determining the height of the propellant in said trap.

LYMAN F. WHITNEY.